(12) United States Patent
Xu et al.

(10) Patent No.: US 10,819,888 B2
(45) Date of Patent: Oct. 27, 2020

(54) CAMERA DECORATION, CAMERA MODULE AND ELECTRONIC APPARATUS

(71) Applicant: Guangdong OPPO Mobile Telecommunications Corp., Ltd., Dongguan, Guangdong (CN)

(72) Inventors: Lisi Xu, Guangdong (CN); Yuxian Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/447,012

(22) Filed: Jun. 20, 2019

(65) Prior Publication Data
US 2019/0394364 A1    Dec. 26, 2019

(30) Foreign Application Priority Data

Jun. 21, 2018 (CN) .................... 2018 2 0966248 U

(51) Int. Cl.
*H04N 5/225* (2006.01)
*H04M 1/02* (2006.01)
*H04M 1/18* (2006.01)

(52) U.S. Cl.
CPC ........ *H04N 5/2252* (2013.01); *H04M 1/0264* (2013.01); *H04M 1/18* (2013.01); *H04N 5/2253* (2013.01); *H04N 5/2254* (2013.01); *H04N 5/2257* (2013.01)

(58) Field of Classification Search
CPC ... H04N 5/2257; H04M 1/024; H04M 1/0246

USPC ......................................... 348/373, 375, 376
See application file for complete search history.

(56) References Cited

U.S. PATENT DOCUMENTS

| 10,425,561 B2* | 9/2019 | Jarvis | H04N 5/2254 |
| 10,486,449 B2* | 11/2019 | Rammah | B41M 5/24 |
| 2011/0050986 A1* | 3/2011 | Wang | G06F 1/1613 348/371 |
| 2011/0315579 A1* | 12/2011 | Mase | H04M 1/0264 206/316.2 |
| 2012/0070140 A1* | 3/2012 | Chow | H04M 1/0264 396/176 |
| 2012/0118773 A1* | 5/2012 | Rayner | H05K 5/0004 206/320 |
| 2014/0253799 A1* | 9/2014 | Moon | H04N 5/2257 348/376 |

(Continued)

FOREIGN PATENT DOCUMENTS

| CN | 203896612 U | 10/2014 |
| CN | 206303349 U | 7/2017 |

(Continued)

OTHER PUBLICATIONS

European search report, EP19181582, dated Aug. 6, 2019 (10 pages).

(Continued)

*Primary Examiner* — Anthony J Daniels

(57) ABSTRACT

A camera decoration may include a main portion defining a first through hole configured to expose a camera; and an extending portion connected to an end of the main portion and defining a second through hole configured to expose a flash. A thickness of the extending portion may be less than a thickness of the main portion.

16 Claims, 5 Drawing Sheets

(56) References Cited

U.S. PATENT DOCUMENTS

| | | | |
|---|---|---|---|
| 2014/0267882 A1* | 9/2014 | O'Neill | G02B 15/10 |
| | | | 348/360 |
| 2015/0366110 A1 | 12/2015 | Park et al. | |
| 2016/0119520 A1* | 4/2016 | Park | H04N 5/2257 |
| | | | 348/373 |
| 2018/0241861 A1* | 8/2018 | Kim | H04M 1/0274 |
| 2018/0352060 A1* | 12/2018 | Gifford | H04M 1/21 |
| 2019/0141221 A1* | 5/2019 | Barros | A45C 11/00 |
| 2019/0199907 A1* | 6/2019 | Daulton | H04N 5/232 |
| 2019/0238668 A1* | 8/2019 | Chen | H04N 5/2257 |
| 2019/0339746 A1* | 11/2019 | Kim | B32B 7/12 |

FOREIGN PATENT DOCUMENTS

| | | |
|---|---|---|
| CN | 107181842 A | 9/2017 |
| CN | 107529002 A | 12/2017 |
| CN | 207117748 U | 3/2018 |
| CN | 207251780 U | 4/2018 |
| CN | 208905034 U | 5/2019 |
| EP | 3460621 A1 | 3/2019 |
| KR | 20060104569 A | 10/2006 |

OTHER PUBLICATIONS

International search report, PCT/CN2019/091906, dated Aug. 27, 2019 (4 pages).

\* cited by examiner

CAMERA DECORATION, CAMERA MODULE AND ELECTRONIC APPARATUS

CROSS-REFERENCE TO RELATED APPLICATION(S)

This application claims priority to Chinese Patent Application No. 201820966248.7, filed on Jun. 21, 2018, the content of which is herein incorporated by reference in its entirety.

TECHNICAL FIELD

The described embodiments relate to an electronic apparatus technology, and more particularly, to a camera decoration and an electronic apparatus.

BACKGROUND

Currently, a camera and a flash of most electronic apparatuses on the market are respectively mounted on the electronic apparatuses. During the processing of a housing of the electronic apparatus, at least two holes are required to be opened, to expose the camera and the flash.

SUMMARY

According to an aspect of the present disclosure, a camera decoration may include a main portion defining a first through hole configured to expose a camera and an extending portion connected to an end portion of the main portion and defining a second through hole configured to expose a flash.

According to another aspect of the present disclosure, an electronic apparatus may include a housing defining a receiving hole and a camera module arranged in the housing and corresponding to the receiving hole. The camera module may include a camera decoration received in the receiving hole and a camera and a flash mounted in the camera decoration. The camera decoration may include a main portion defining a first through hole and an extending portion connected to an end of the main portion and defining a second through hole. At least part of the camera may be exposed from the first through hole, and at least part of the flash may be exposed from the second through hole.

According to still another aspect of the present disclosure, a camera module may include a camera, a flash and a camera protector defining a first through hole and a second through hole. A part of the camera may be inserted into the first through hole, a part of the flash may be inserted into the second through hole.

BRIEF DESCRIPTION OF DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

Figure 1:
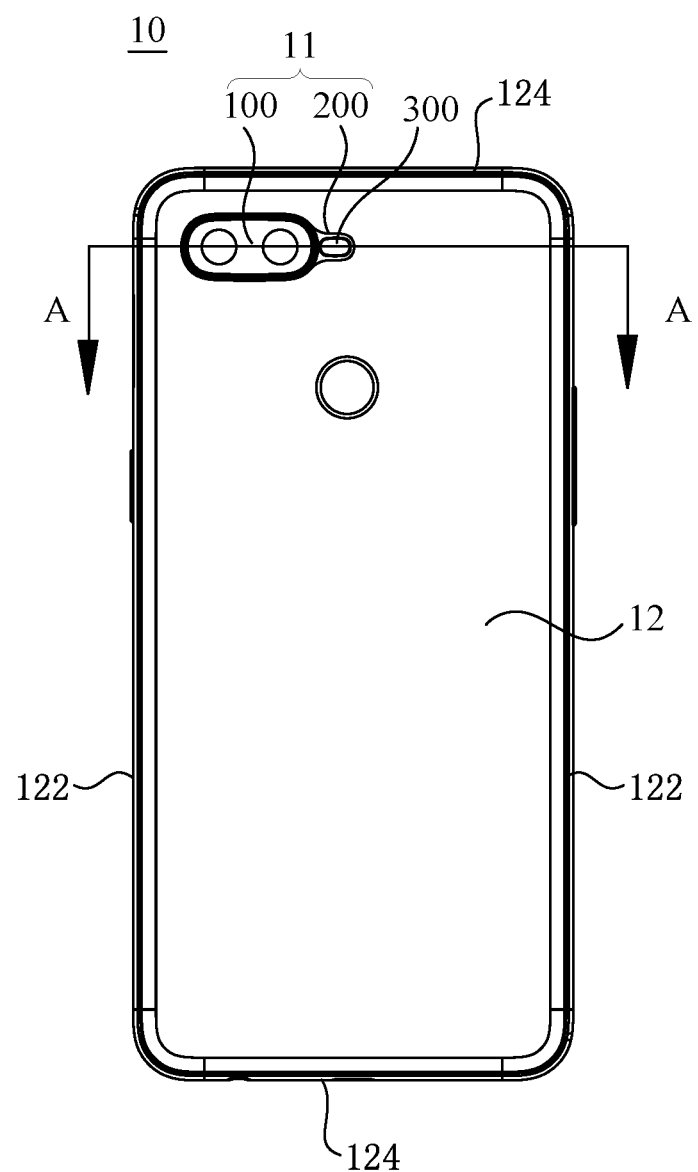
FIG. 1 is a structural schematic view of an electronic apparatus in accordance with an embodiment in the present disclosure.

In order to facilitate the understanding of the present disclosure, the present disclosure will be described more fully hereinafter with reference to the accompanying drawings. Preferred embodiments of the present disclosure are given in the drawings. However, the present disclosure may be embodied in many different forms and is not limited to the embodiments described herein. Rather, these embodiments are provided so that the understanding of the present disclosure will be more thorough.

A "terminal device" as used herein may refer to a device configured to receive and/or transmit a communication signal by including, but being not limited to any one or more of the following connection methods.

(1) A connection method by a wired line, such as a public switched telephone network (PSTN), a digital subscriber line (DSL), a digital cable, and a direct cable connection.

(2) A connection method by a wireless interface, such as a cellular network, a wireless local area network (WLAN), a digital television network such as a DVB-H network, a satellite network, and an AM-FM broadcast transmitter.

A terminal device configured to receive and/or transmit a communication signal by the wireless interface may be referred as a "mobile terminal". The mobile terminal may include, but may be not limited to the following electronic apparatuses.

(1) A satellite or cellular radiotelephone telephone.

(2) A terminal of personal communications system (PCS) that may combine cellular radiotelephone with data processing, fax, and data communication capabilities.

(3) A radiotelephone, a pager, an internet/intranet access, a web browser, a notepad, a calendar, a personal digital assistant (PDA) equipped with a global positioning system (GPS) receiver.

(4) A conventional laptop and/or a palm receiver.

(5) A conventional laptop and/or a palm-type radiotelephone transceiver and the like.

According to an aspect of the present disclosure, a camera decoration may include a main portion defining a first through hole configured to expose a camera, and an extending portion connected to an end of the main portion and defining a second through hole configured to expose a flash.

In an embodiment, the main portion may include a first face, a second face arranged opposite to the first face; and a first side circumference connecting the first face and the second face. The first through hole may penetrate the first face and the second face.

In an embodiment, the extending portion may include a third face, a fourth face arranged opposite to the third face; and a second side circumference connecting the third face and the fourth face. The second through hole may penetrate the third face and the fourth face. The third face may be on a same side with the first face. The fourth face may be on a same side with the second face and depressed toward the third face relative to the second face.

In an embodiment, the third face may be depressed toward the fourth face relative to the first face.

In an embodiment, an area of the third face may be less than an area of the first face; and an area of the fourth face may be less than an area of the second face.

In an embodiment, the main portion and the extending portion may share a same central axis, and a width of the third face in a direction perpendicular to the central axis may be less than that of the first face.

In an embodiment, the first side circumference and the second circumference may be connected to each other smoothly.

In an embodiment, the main portion may further include a protrusion portion located at an edge of the first face and surrounding the first face. The protrusion portion may include an inner face perpendicular to the first face; and an outer face arranged opposite to the inner face. An angle between the outer face and the first face is an acute angle; and a part of the outer face may be connected to the first side circumference, and the other part of the outer face may be connected to the third face.

In an embodiment, the protrusion portion may further include a platform face connecting the inner face and the outer face, and a distance between the outer face and the inner face may be gradually decreased in a direction from the first face to the platform face.

In an embodiment, when a number of the first through hole is one, the first through hole may be defined at a central position of the main portion; or when the number of the first through hole is two, the two first through holes may be symmetrically relative to a central axis of the main portion.

In an embodiment, the second through hole may be an elliptical through hole, a waist circular hole, or a square through hole with four smooth corners; and the second through hole may be defined at a center of the extending portion.

In an embodiment, the main portion may have a runway shape. A thickness of the extending portion is less than a thickness of the main portion.

In an embodiment, the main portion and the extending portion may be formed of a single piece.

According to another aspect of the present disclosure, an electronic apparatus may include a housing defining a receiving hole and a camera module arranged in the housing and corresponding to the receiving hole. The camera module may include a camera decoration received in the receiving hole, a camera and a flash mounted in the camera decoration. The camera decoration may include a main portion defining a first through hole and an extending portion connected to an end of the main portion and defining a second through hole. At least part of the camera may be exposed from the first through hole, and at least part of the flash may be exposed from the second through hole.

In an embodiment, the main portion may include a first face, a second face arranged opposite to the first face; and a first side circumference connecting the first face and the second face, the first through hole may penetrate the first face and the second face.

In an embodiment, the extending portion may include a third face, a fourth face arranged opposite to the third face; and a second side circumference connecting the third face and the fourth face. The second through hole may penetrate the third face and the fourth face, the third face may be on a same side with the first face; and the fourth face may be on a same side with the second face and depressed toward the third face relative to the second face.

In an embodiment, an inner face of the receiving hole may engage with the first side circumference and the second side circumference.

In an embodiment, the main portion and the extending portion may share a same central axis; and a width of the third face in a direction perpendicular to the central axis may be less than that of the first face.

In an embodiment, the first side circumference and the second circumference may be connected to each other smoothly.

According to still another aspect of the present disclosure, a camera module may include a camera, a flash and a camera protector defining a first through hole and a second through hole. A part of the camera may be inserted into the first through hole, a part of the flash may be inserted into the second through hole.

In an embodiment, a depth of the first through hole may be greater than a depth of the second through hole.

Figure 2:
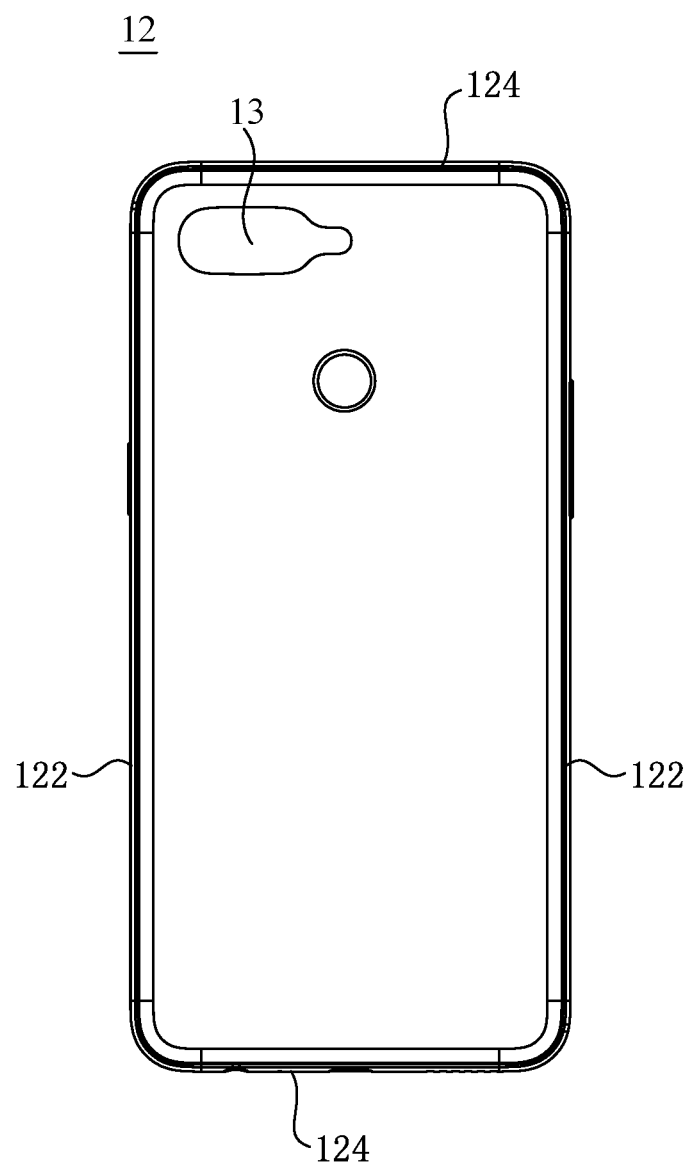
FIG. 2 is a structural schematic view of the electronic apparatus shown in FIG. 1, and a camera module is removed.
Figure 3:
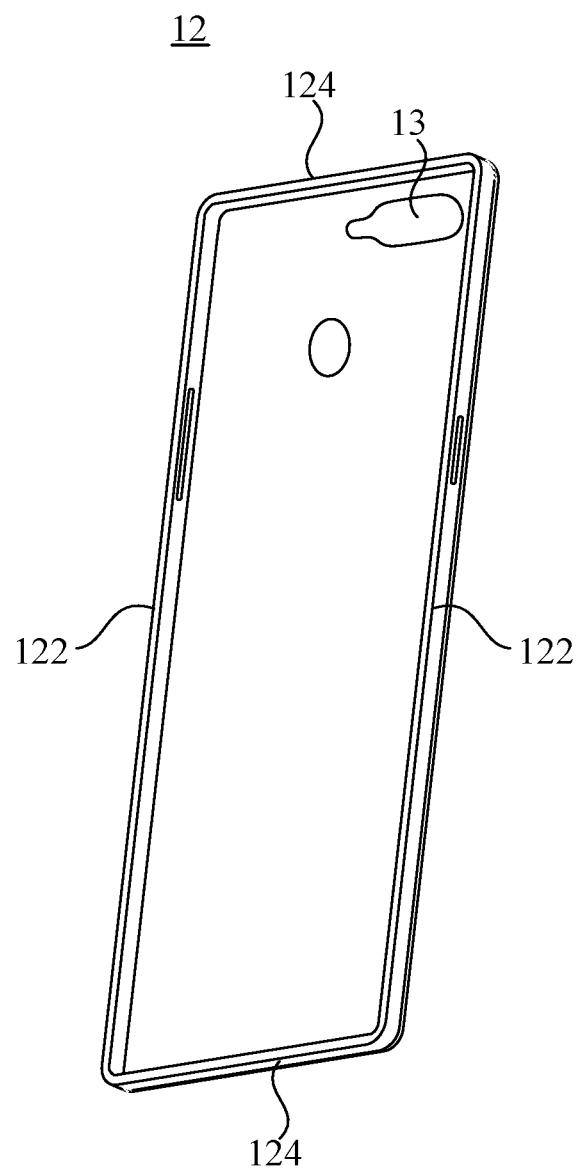
FIG. 3 is a three-dimensional structural schematic view of the electronic apparatus shown in FIG. 1.
Figure 4:
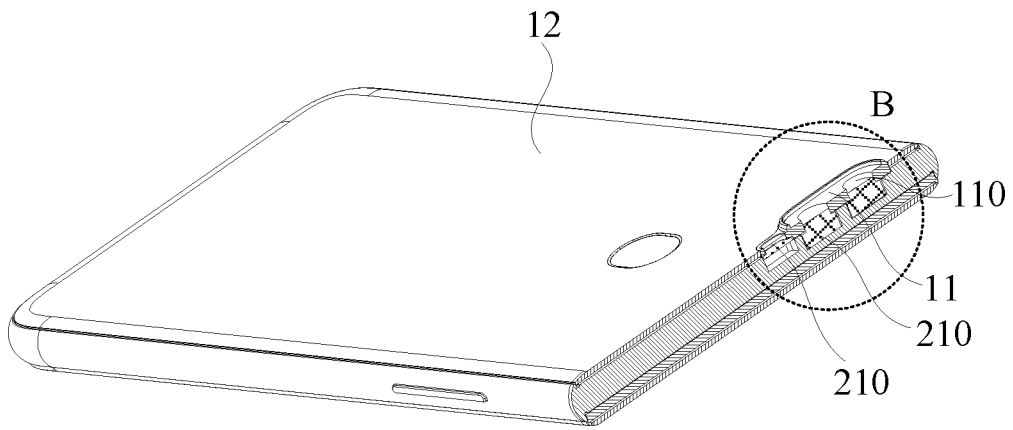
FIG. 4 is a three-dimensional sectional view of the electronic apparatus shown in FIG. 1, taken along a line A-A thereof.

FIG. 1 illustrates an electronic apparatus according to an embodiment of the present disclosure. The electronic apparatus 10 may be, but not limited to, a mobile phone. The electronic apparatus 10 may include a housing 12 and a camera module arranged in the housing 12. The housing 12 may define a receiving hole 13 penetrating the housing 12, as shown in FIGS. 2 to 4. The camera module may correspond to the receiving hole 13, such that a part of the camera module could be exposed from the receiving hole 13. In an embodiment, the part of the camera module may be inserted into the receiving hole 13. The housing 12 may include two first sides 122 opposite and parallel to each other, and two second sides 124 opposite and parallel to each other. The first sides 122 and the second sides 124 may be connected end to end. In an embodiment, each of the first sides 122 may be longer than each of the second sides 124.

Figure 5:
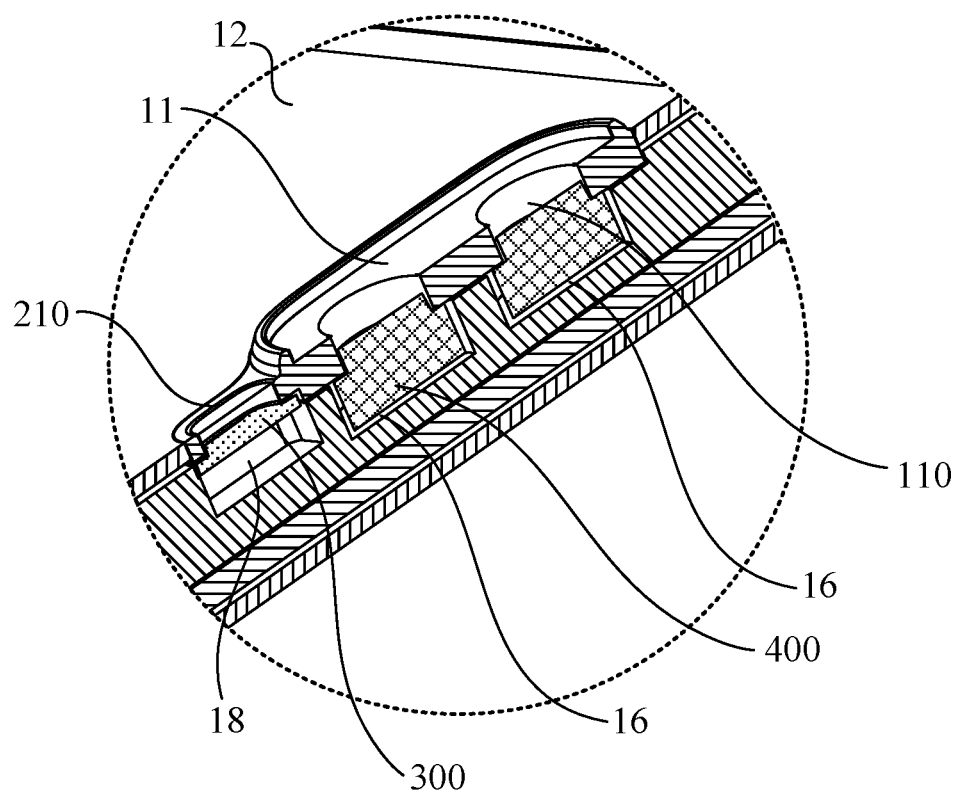
FIG. 5 is an enlarged view of a structure at a portion B of the electronic apparatus shown in FIG. 4.

Referring to FIG. 5, in an embodiment, the camera module may include a camera 400, a flash 300, a camera decoration 11 configured to fix the camera 400 and the flash 300, and the like. The camera module may be a dual camera module or a single camera module, and a number of the camera is not limited herein.

Figure 6:
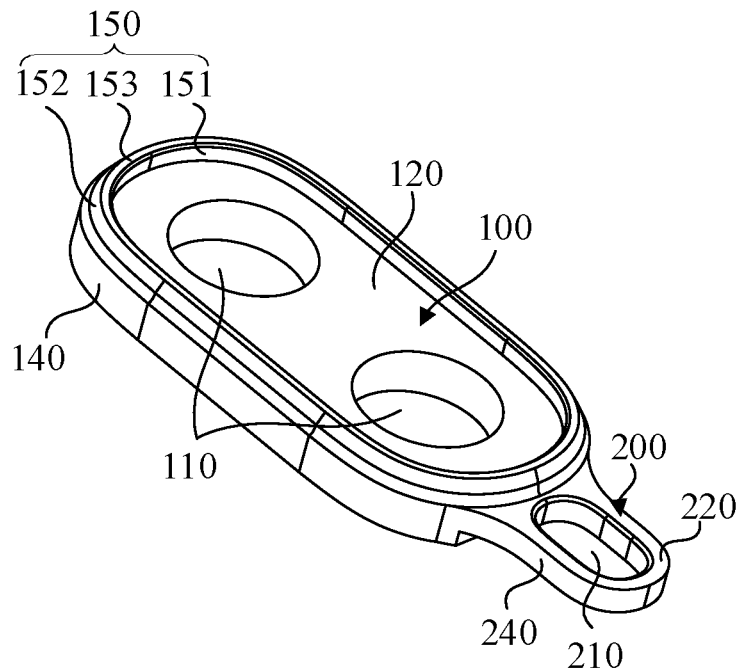
FIG. 6 is a three-dimensional structural schematic view of a camera decoration in the electronic apparatus shown in FIG. 1.
Figure 7:
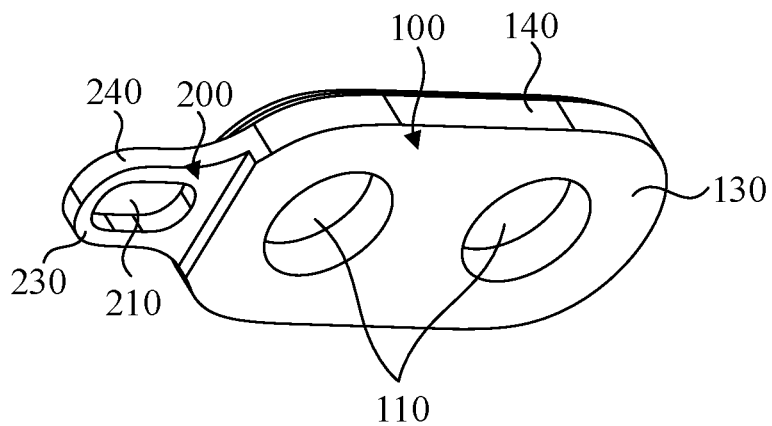
FIG. 7 is a three-dimensional structural schematic view of the camera decoration shown in FIG. 6, in another view angle.

Referring to FIG. 6 and FIG. 7, in an embodiment, the camera decoration 11 may be configured to garnish the electronic apparatus and fix the camera 400 and the flash 300 on the electronic apparatus, such as a mobile phone or a tablet computer. The camera decoration 11 may include a main portion 100 and an extending portion 200. The main portion 100 may be a structure having a runway shape. The runway shape may be understood as a circle that is divided into two semicircles from a center of the circle, the two semicircles move in opposite directions respectively, and two parallel lines with equal length join ends of the two semicircles to form a closed shape.

The main portion 100 may include a first face 120, a second face 130, and a first side circumference 140. The second face 130 may be arranged opposite to the first face 120. The first side circumference 140 may connect the first face 120 and the second face 130.

A first through hole 110 may be defined on the main portion 100. The first through hole 110 may penetrate the first face 120 and the second face 130. The first through hole 110 may be a circular through hole. A number of the first through hole 110 may be one, two or more. When the number of the first through hole 110 is one, the first through hole 110 may be defined at a central of the main portion 100. When the number of the first through hole 110 is two, the two first through holes 110 may be symmetrically relative to a central axis the main portion 100.

The extending portion 200 may be arranged at an end of the main portion 100. In an embodiment, the extending portion 200 may extend from the end of the main portion 100 and may have an integral structure with the main portion 100. An end of the extending portion 200 may be connected to the main portion 100, and the other end away from the main portion 100 may have a configuration of semi-cylindrical.

The extending portion 200 may include a third face 220, a fourth face 230 arranged opposite to the third face 220, and a second side circumference 240 connecting the third face 220 and the fourth face 230. The third face 220 may be on a same side with the first face 120. In an embodiment, an area of the third face 220 may be less than an area of the first face 120. The fourth face 230 may be on a same side with the second face 130. An area of the fourth face 230 may be less than an area of the second face 130. Therefore, the area of the entire electronic apparatus 10 covered by the camera decoration may be reduced, which could reduce heat generated by components in the electronic apparatus 10 could be reduced. Furthermore, heat in the electronic apparatus 10 could be dissipated more quickly and easily. As a result, heat dissipation effect of entire electronic apparatus 10 could be improved. In an embodiment, the main portion 100 and the extending portion 200 share a same central axis, a width of the third face 220 in a direction perpendicular to the central axis may be less than that of the first face 110.

The first side circumference 140 and the second side circumference 240 may be connected smoothly.

In an embodiment, a second through hole 210 may be defined on the extending portion 200. The second through hole 210 may penetrate the third face 220 and the fourth face 230. The second through hole 210 may be an elliptical through hole, a waist circular through hole, or a square through hole with four smooth corners. The second through hole 210 may be located at a center of the extending portion 200.

The camera 400 may be arranged corresponding to the first through hole 110, and the flash 300 may be arranged corresponding to the second through hole 210. In an embodiment, a part of the camera 400 may be inserted in the first through hole 110. The flash 300 may be arranged in the second through hole 210. Therefore, the camera decoration 11 could integrate the camera 400 and the flash 300, so as to make a camera module more compact and more powerful and being not damaged easily. In addition, only one receiving hole 13 may be required in the housing 12, so that processing difficulty of the housing 12 may be reduced.

A thickness of the extending portion 200 may be less than a thickness of the main portion 100. The third face 220 may be depressed toward the fourth face 230 relative to the first face 120, that is, the third face 220 may not protrude relative to the first face 120 and there may be a little difference in height between the first face 120 and the third face 220. The fourth face 230 may be depressed toward the third face 220 relative to the second face 130, that is, the fourth face 230 may not protrude relative to the second face 130 and there may be a difference in height between the second face 130 and the fourth face 230.

Since a volume of the flash 300 is smaller than that of the camera 400, a depth of the second through hole 210 could be less than that of the first through hole 110, that is, the thickness of the extending portion 200 could be less than the thickness of the main portion 100, heat generated by components in the electronic apparatus 10 could be dissipated from the extending portion 200 more quickly and easily. Therefore, heat dissipation effect of entire electronic apparatus 10 could be improved.

Referring to FIG. 7, there may be a step between the fourth face 230 and the second face 130, which could match the assembly of components inside the electronic apparatus 10.

In an embodiment, a protrusion portion 150 may be arranged on the main portion 100. The protrusion portion 150 may be an annular structure located at an edge of the first face 120 and may surround the first face 120. The protrusion portion 150 may include an inner face 151, an outer face 152, and a platform face 153 connecting the inner face 151 and the outer face 152. The inner face 151 may be substantially perpendicular to the first face 120. An angle between the outer face 152 and the first face 120 may be an acute angle. That is, a distance between the outer face 152 and the inner face 151 may be gradually decreased in a direction from the first face 120 to the platform face 153. The outer face 152 may be connected to the first side circumference 140. The platform face 153 may be parallel to the first face 120. The protrusion portion 150 may be configured to fix lens. When an electronic apparatus 10 is dropped, the protrusion portion 150 may also prevent a camera from being broken.

In an embodiment, the main portion 100 and the extending portion 200 may be made of a metal material, so that the main portion 100 and the extending portion 200 may have higher strength and a thinner thickness. The main portion 100 and the extending portion 200 may be formed of a single piece by stamping and/or casting. A coating may be arranged on an outer face of the main portion 100 and the extending portion 200. A color of the coating may be same as a color of an outer face of the housing 12, or may be different.

In other embodiments, the main portion 100 and the extending portion 200 may be made of a polymer material, so that the main portion 100 and the extending portion 200 may be installed on the housing 12 easily, so as to protect the camera 400 and the flash 300. When the electronic apparatus 10 is dropped, the elastic polymer material may absorb impact, so that damage to the camera and the flash 300 may be reduced. A coating may be arranged on an outer face of the main portion 100 and the extending portion 200, A color of the coating may be same as a color of an outer face of the housing 12, or may be different.

In an embodiment, the camera 400 may be arranged in the first through hole 110. A light incident face of the camera 400 may be flush with an end of the first through hole 110. In another embodiment, the light incident face of the camera 400 may protrude or depress slightly relative to the end of the first through hole 110. Light may enter into the first through hole 110 via the light incident face, so that the camera 400 in the first through hole 110 could capture images or record. In an embodiment, the camera 400 may include a lens, the light incident face may be an outer face of the lens, material of the lens may be relatively hard. For example, the lens may be made of sapphire glass, which may be difficult to be worn, so that reliability of a camera assembly could be improved.

As shown in FIG. 5, a first cavity 16 corresponding to the first through hole 110 may be defined in the electronic apparatus 10. The first cavity 16 may be communicated with the first through hole 110. Both the first cavity 16 and the first through hole 110 may receive the camera module.

In an embodiment, the flash 300 may be arranged in the second through hole 210. The flash 300 may include a mirror fixed on an end of the second through hole 210, such as the end close to the third face 220. Light emitted by the flash 300 may be transmitted from the second through hole 210 to illuminate an object to be photographed, so that the camera may be assisted to capture images or record.

As shown in FIG. 5, a second cavity 18 corresponding to the second through hole 210 may be defined in the electronic apparatus 10. The second cavity 18 may be communicated with the second through hole 210. The second cavity 18 and the second through hole 210 may be configured to receive the flash 300.

In an embodiment, the camera decoration 11 may be received in the receiving hole 13. A shape of the receiving hole 13 and a shape of the camera decoration 11 may be matched with each other. The camera decoration 11 may be mounted in the receiving hole 13. An inner face of the receiving hole 13 may engage with the first side circumference 140 and the second side circumference 240. The protrusion portion 150 may be located outside the receiving hole 13. The receiving hole 13 may be defined laterally as shown in FIG. 1 and FIG. 2, or may be defined longitudinally, and is not specifically limited herein. For example, a direction from a space of the receiving hole 13 for receiving the main portion 100 to a space of the receiving hole 13 for receiving the extending portion 200 may be parallel to the second side 124 of the housing 12. In other embodiments, a direction from a space of the receiving hole 13 for receiving the main portion 100 to a space of the receiving hole 13 for receiving the extending portion 200 may be parallel to the first side 122 of the housing 12.

The technical features of the above-mentioned embodiments may be arbitrarily combined. For the sake of brevity of description, all possible combinations of the technical features in the above-mentioned embodiments are not described. However, as long as there is no contradiction between the combinations of these technical features, all should be considered as the scope of this manual.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A camera decoration, comprising:
a main portion defining a first through hole configured to expose a camera; and
an extending portion connected to an end of the main portion and defining a second through hole configured to expose a flash,
wherein the main portion comprises:
a first face;
a second face arranged opposite to the first face; and
a first side circumference connecting the first face and the second face;
the first through hole penetrates the first face and the second face,
the extending portion comprises:
a third face;
a fourth face arranged opposite to the third face; and
a second side circumference connecting the third face and the fourth face;
the second through hole penetrates the third face and the fourth face;
the third face is on a same side with the first face; and
the fourth face is on a same side with the second face and depressed toward the third face relative to the second face.

2. The camera decoration according to claim 1, wherein the third face is depressed toward the fourth face relative to the first face.

3. The camera decoration according to claim 1, wherein an area of the third face is less than an area of the first face, and an area of the fourth face is less than an area of the second face.

4. The camera decoration according to claim 3, wherein the main portion and the extending portion share a same central axis; and
a width of the third face in a direction perpendicular to the central axis is less than that of the first face.

5. The camera decoration according to claim 1, wherein the first side circumference and the second side circumference are connected to each other smoothly.

6. The camera decoration according to claim 1, wherein the main portion further comprises a protrusion portion located at an edge of the first face and surrounding the first face, and the protrusion portion comprises:
an inner face perpendicular to the first face; and
an outer face arranged opposite to the inner face,
wherein:
an angle between the outer face and the first face is an acute angle; and
a part of the outer face is connected to the first side circumference, and a remaining part of the outer face is connected to the third face.

7. The camera decoration according to claim 6, wherein the protrusion portion further comprises a platform face connecting the inner face and the outer face; and
a distance between the outer face and the inner face is gradually decreased in a direction from the first face to the platform face.

8. The camera decoration according to claim 1, wherein when a number of the first through hole is one, the first through hole is defined at a central position of the main portion; or
when the number of the first through hole is two, the two of the first through holes are symmetrical, relative to a central axis of the main portion.

9. The camera decoration according to claim 1, wherein the second through hole is an elliptical through hole, a waist circular hole, or a square through hole with four smooth corners; and
the second through hole is defined at a center of the extending portion.

10. The camera decoration according to claim 1, wherein the main portion has a runway shape; and
a thickness of the extending portion is less than a thickness of the main portion.

11. The camera decoration according to claim 1, wherein the main portion and the extending portion are formed of a single piece.

12. An electronic apparatus, comprising:
a housing, defining a receiving hole; and
a camera module arranged in the housing and corresponding to the receiving hole,
wherein the camera module comprises:
a camera decoration received in the receiving hole; and
a camera and a flash mounted in the camera decoration,
wherein the camera decoration comprises:
a main portion defining a first through hole; and
an extending portion connected to an end of the main portion and defining a second through hole, wherein at least a part of the camera is exposed from the first through hole, and at least a part of the flash is exposed from the second through hole;

the main portion comprises:
a first face;
a second face arranged opposite to the first face; and
a first side circumference connecting the first face and the second face;

the first through hole penetrates the first face and the second face, the extending portion comprises:
a third face;
a fourth face arranged opposite to the third face; and
a second side circumference connecting the third face and the fourth face;

the second through hole penetrates the third face and the fourth face;

the third face is on a same side with the first face; and the fourth face is on a same side with the second face and depressed toward the third face relative to the second face.

13. The electronic apparatus according to claim 12, wherein an inner face of the receiving hole engages with the first side circumference and the second side circumference.

14. The electronic apparatus according to claim 13, wherein the main portion and the extending portion share a same central axis; and
a width of the third face in a direction perpendicular to the central axis is less than that of the first face.

15. The electronic apparatus according to claim 14, wherein the first side circumference and the second side circumference are connected to each other smoothly.

16. A camera module, comprising a camera, a flash and a camera protector defining a first through hole and a second through hole, wherein:
a part of the camera is inserted into the first through hole; and
a part of the flash is inserted into the second through hole;

wherein the camera protector comprises:
a main portion defining the first through hole; and
an extending portion connected to an end of the main portion and defining the second through hole, wherein the main portion comprises:
a first face;
a second face arranged opposite to the first face; and
a first side circumference connecting the first face and the second face;

the first through hole penetrates the first face and the second face, the extending portion comprises:
a third face;
a fourth face arranged opposite to the third face; and
a second side circumference connecting the third face and the fourth face;

the second through hole penetrates the third face and the fourth face;

the third face is on a same side with the first face; and the fourth face is on a same side with the second face and depressed toward the third face relative to the second face.

* * * * *